United States Patent
Hamilton et al.

(10) Patent No.: US 8,107,694 B2
(45) Date of Patent: Jan. 31, 2012

(54) METHOD OF TRACKING SPECKLE DISPLACEMENT BETWEEN TWO IMAGES

(75) Inventors: James Hamilton, Brighton, MI (US); Matthew O'Donnell, Seattle, WA (US)

(73) Assignee: Ultrasound Medical Devices, Inc., Ann Arbor, MI (US)

( * ) Notice: Subject to any disclaimer, the term of this patent is extended or adjusted under 35 U.S.C. 154(b) by 1079 days.

(21) Appl. No.: 11/781,212

(22) Filed: Jul. 20, 2007

(65) Prior Publication Data
US 2008/0019609 A1 Jan. 24, 2008

Related U.S. Application Data

(60) Provisional application No. 60/807,876, filed on Jul. 20, 2006.

(51) Int. Cl.
*G06K 9/00* (2006.01)

(52) U.S. Cl. ......... 382/128; 382/131; 382/132; 382/103

(58) Field of Classification Search .................. 382/128, 382/131, 132, 103; 600/450
See application file for complete search history.

(56) References Cited

U.S. PATENT DOCUMENTS

| | | | |
|---|---|---|---|
| 5,503,153 A | 4/1996 | Liu et al. |
| 5,675,554 A | 10/1997 | Cole et al. |
| 5,800,356 A | 9/1998 | Criton et al. |
| 5,873,830 A | 2/1999 | Hossack et al. |
| 5,876,342 A | 3/1999 | Chen et al. |
| 5,934,288 A | 8/1999 | Avila et al. |
| 5,976,088 A | 11/1999 | Urbano et al. |
| 6,015,385 A | 1/2000 | Finger et al. |
| 6,042,547 A | 3/2000 | Wright et al. |
| 6,056,691 A | 5/2000 | Urbano et al. |
| 6,066,095 A | 5/2000 | Morsy et al. |
| 6,083,168 A | 7/2000 | Hossack et al. |
| 6,099,471 A | 8/2000 | Torp et al. |
| 6,142,946 A | 11/2000 | Hwang et al. |
| 6,162,174 A | 12/2000 | Friemel |
| 6,213,947 B1 | 4/2001 | Phillips |
| 6,228,028 B1 | 5/2001 | Klein et al. |
| 6,270,459 B1 | 8/2001 | Konofagu et al. |
| 6,277,075 B1 | 8/2001 | Torp et al. |
| 6,282,963 B1 | 9/2001 | Haider |
| 6,312,381 B1 | 11/2001 | Knell et al. |
| 6,318,179 B1 | 11/2001 | Hamilton et al. |
| 6,346,079 B1 | 2/2002 | Haider et al. |

(Continued)

OTHER PUBLICATIONS

Li et al., High resolution 2-D quantification of myocardial add motion abnormalities in mice using high resolution ultrasound with MRI validation, Biomedical Imaging: Nano to Macro, 3rd IEEE International Symposium on Apr. 6-9, 2006.*

(Continued)

*Primary Examiner* — Claire X Wang
(74) *Attorney, Agent, or Firm* — Jeffrey Schox

(57) ABSTRACT

In a first preferred embodiment, the invention includes a method of tracking displacements between ultrasound images by calculating a coarse displacement estimate, and calculating a fine displacement estimate using images and coarse displacement estimate. In a second preferred embodiment, the invention includes a method of calculating a coarse displacement estimate from images by reducing the resolution of the images, correlating the reduced resolution images, and calculating the location of the peak of the correlation function. In a third preferred embodiment, the invention includes a method of calculating a finer displacement estimate from images by using a coarse displacement estimate with correlation processing of the images and calculating the location of the peak value of the correlation function.

18 Claims, 7 Drawing Sheets

U.S. PATENT DOCUMENTS

| | | | |
|---|---|---|---|
| 6,350,238 | B1 | 2/2002 | Olstad et al. |
| 6,352,507 | B1 | 3/2002 | Torp et al. |
| 6,360,027 | B1 | 3/2002 | Hossack et al. |
| 6,443,894 | B1 | 9/2002 | Sumanaweera et al. |
| 6,447,450 | B1 | 9/2002 | Olstad |
| 6,447,453 | B1 | 9/2002 | Roundhill et al. |
| 6,447,454 | B1 | 9/2002 | Chenal et al. |
| 6,520,913 | B1 | 2/2003 | Pesavento et al. |
| 6,527,717 | B1 | 3/2003 | Jackson et al. |
| 6,537,217 | B1 | 3/2003 | Bjærum et al. |
| 6,537,221 | B2 | 3/2003 | Criton et al. |
| 6,638,221 | B2 | 10/2003 | Abe et al. |
| 6,666,823 | B2 | 12/2003 | Yao |
| 6,676,599 | B2 | 1/2004 | Torp et al. |
| 6,676,603 | B2 | 1/2004 | Aichhorn et al. |
| 6,776,759 | B2 | 8/2004 | Heimdal et al. |
| 6,976,961 | B2 | 12/2005 | Jackson et al. |
| 6,994,673 | B2 | 2/2006 | Lysyansky et al. |
| 7,033,320 | B2 | 4/2006 | Von Behren et al. |
| 7,077,807 | B2 | 7/2006 | Torp et al. |
| 7,131,947 | B2 | 11/2006 | Demers |
| 7,536,043 | B2 | 5/2009 | Fan et al. |
| 2003/0036701 | A1 | 2/2003 | Dong et al. |
| 2003/0063775 | A1 | 4/2003 | Rafii et al. |
| 2006/0002601 | A1* | 1/2006 | Fu et al. ..................... 382/132 |
| 2007/0276236 | A1 | 11/2007 | Jong |
| 2008/0019609 | A1 | 1/2008 | Hamilton et al. |
| 2008/0021319 | A1 | 1/2008 | Hamilton |
| 2008/0021945 | A1 | 1/2008 | Hamilton et al. |
| 2008/0214934 | A1 | 9/2008 | Lee et al. |

OTHER PUBLICATIONS

D'Hodge, J., et al. "Regional Strain and Strain Rate Measurements by Cardiac Ultrasound: Principles, Implementation and Limitations" The European Society of Cardiology p. 145-170 Jun. 23, 2009.

Kaluzynski, K., et al. "Strain Rate Imaging Using Two-dimensional Speckle Tracking" IEEE Transactions on Ultrasonics, Ferroelectrics, and Frequency Control p. 1111-1123 Jul. 1, 2001.

L.N. Bohs et al., "Speckle tracking for multi-dimensional flow estimation" Elsevier Science B.V., Ultrasonics vol. 38 p. 369-375 Mar. 1, 2000.

* cited by examiner

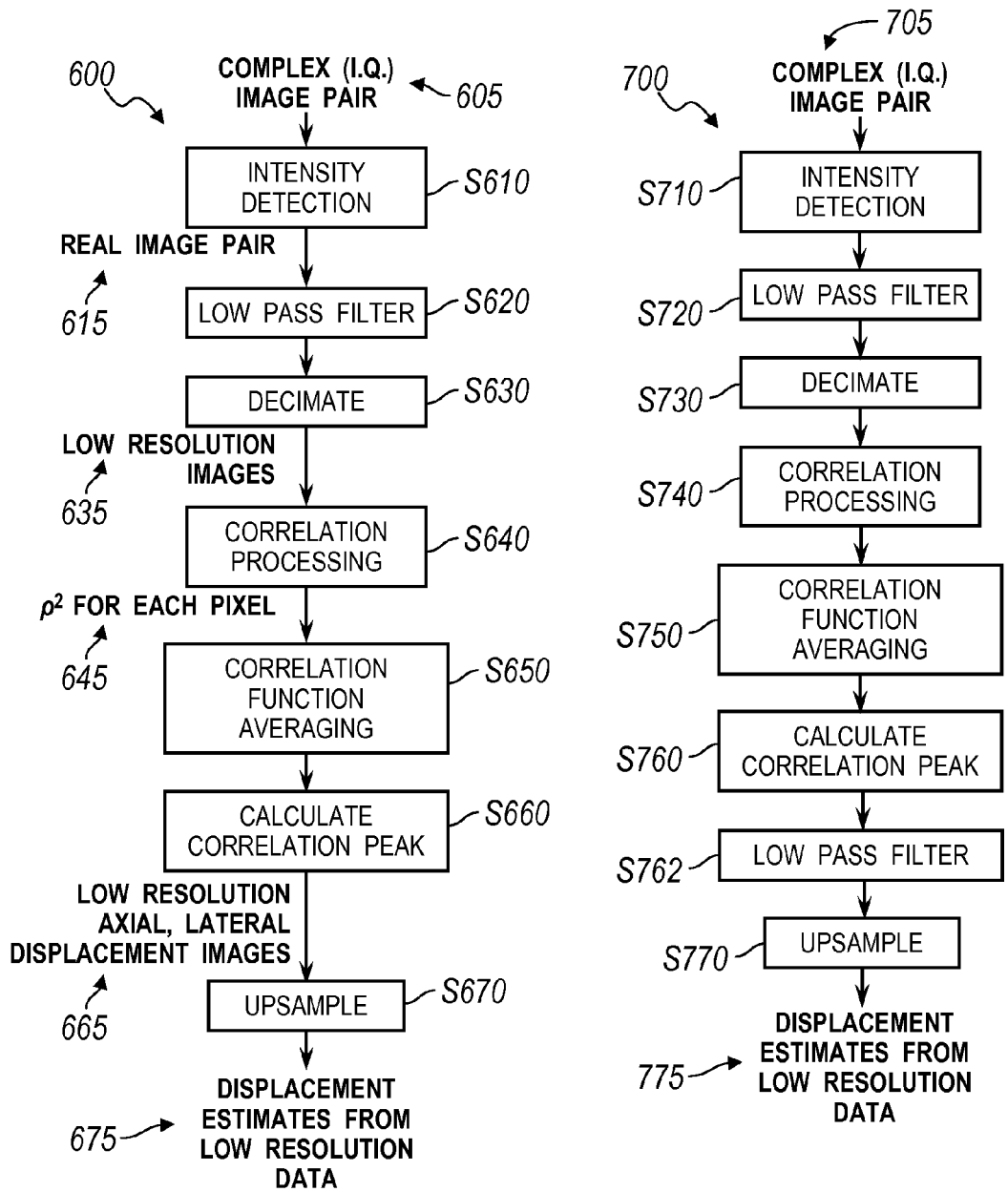

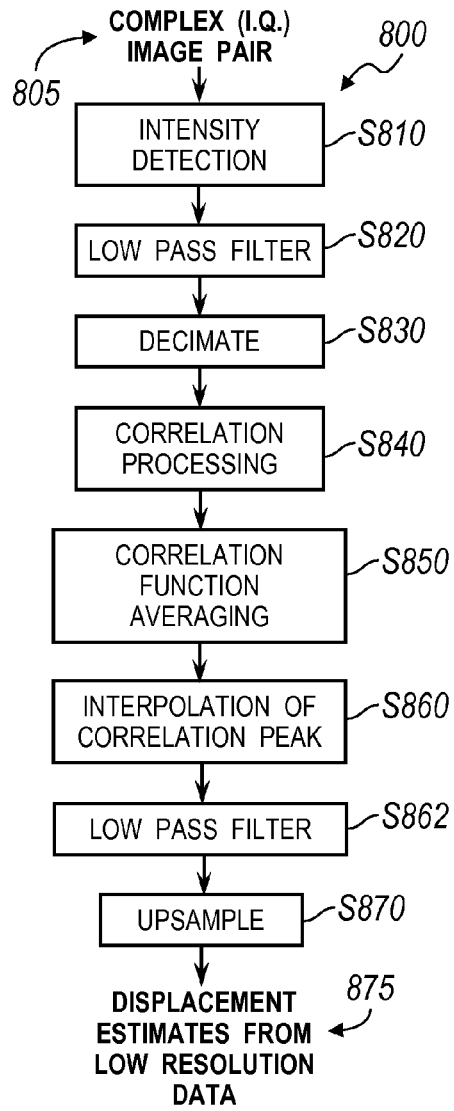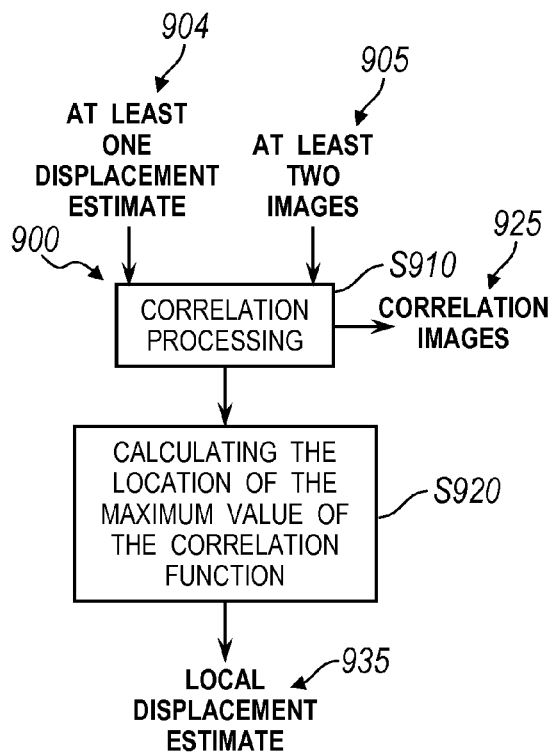
FIG. 8
FIG. 9

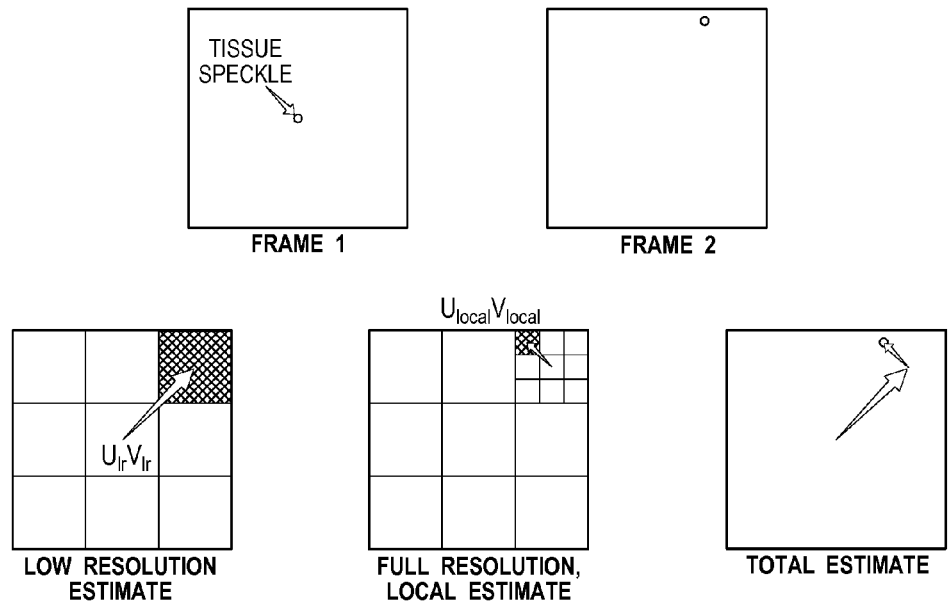
FIG. 12
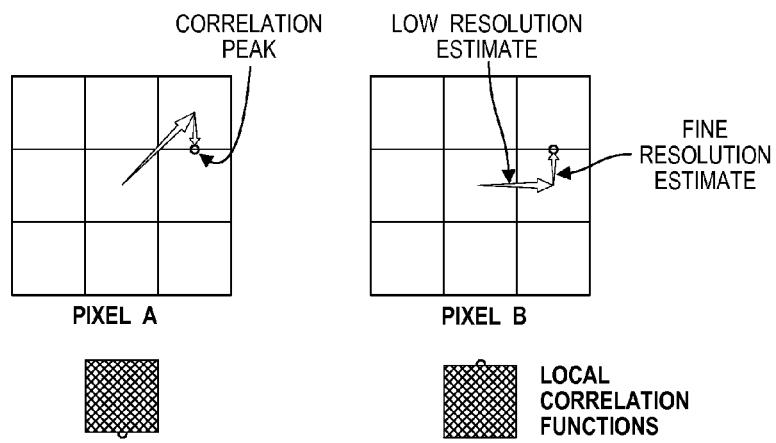
FIG. 13
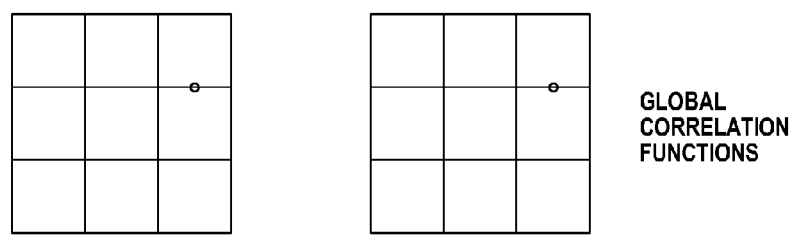

METHOD OF TRACKING SPECKLE DISPLACEMENT BETWEEN TWO IMAGES

CROSS-REFERENCE TO RELATED APPLICATIONS

This application claims the benefit of U.S. Provisional Application No. 60/807,876 filed 20 Jul. 2006 and entitled "Multi-Resolution Tissue Tracking", which is incorporated in its entirety by this reference.

STATEMENT REGARDING FEDERALLY SPONSORED RESEARCH OR DEVELOPMENT

This invention was supported by a grant from the National Heart, Lung, and Blood Institute This invention was made with government support under grant #5R44HL071379 awarded by the National Heart, Lung and Blood Institute. The U.S. government has certain rights in the invention.

TECHNICAL FIELD

This invention relates generally to the ultrasound field, and more specifically to an improved method in the speckle tracking and elastography fields.

BACKGROUND

Measurements of tissue mechanical properties can be used to assist in the assessment of health and functionality of organs and other distinct parts of an organism. For example, ultrasound based strain or strain rate images of the heart muscle, known as the myocardium, can be used to measure the ability of the heart muscle to contract with high spatial and temporal resolution. Such assessment may be useful in diagnosing and monitoring patients with various forms of heart disease. In order to perform such measurements, the displacement of tissue is typically tracked using cross correlation methods. Correlation processing of ultrasound data for tissue tracking is, however, computationally intensive for large search regions with many pixels. In addition, the computations increase with the size of the correlation search area. Thus, tracking large displacements over full ultrasound frames requires greater computational resources, impacting system performance, processing design and cost. Thus, there is a need in the ultrasound field to create an improved method for speckle tracking. This invention provides such improved method.

BRIEF DESCRIPTION OF THE FIGURES

FIGS. 6, 7 and 8 are schematics of the second, third and fourth preferred embodiments of the coarse displacement processing method using low resolution images.

FIG. 9 is a schematic of the first preferred embodiment of the displacement processing method using multi-resolution data.

FIG. 12 is a schematic representation of the relationship between low and full resolution displacement estimates.

FIG. 13 includes examples of local and global correlation functions for the same displacement.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. General Description of the Preferred Method

Figure 1:
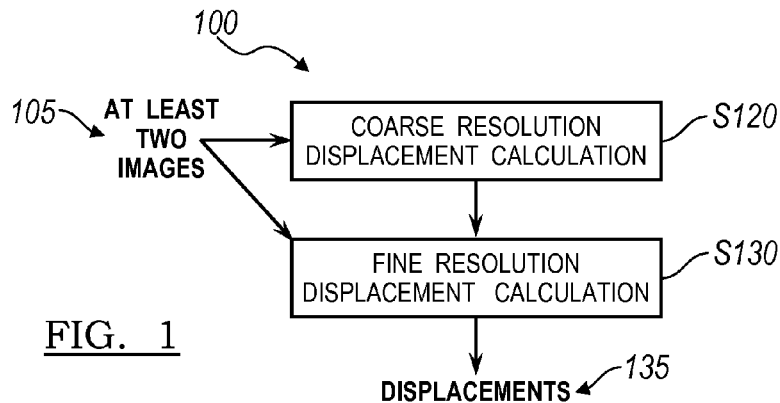
FIG. 1 is a schematic of the displacement processing method of a first preferred embodiment.
Figure 2:
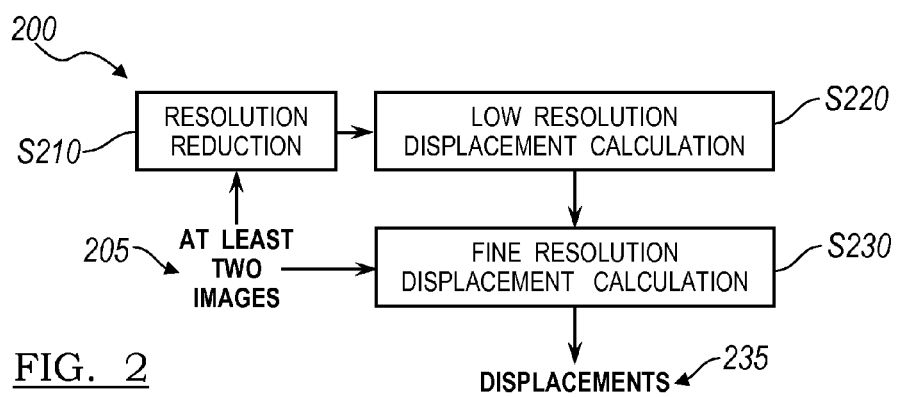
FIG. 2 is a schematic of the displacement processing method of a second preferred embodiment.
Figure 3:
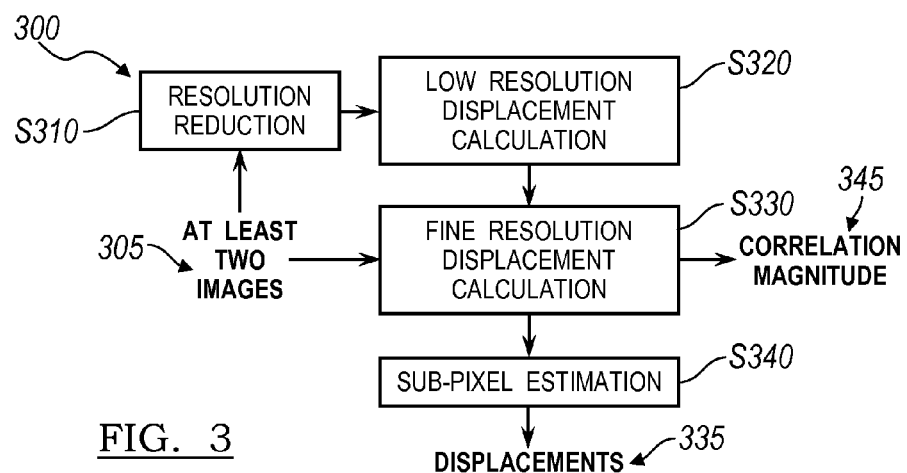
FIG. 3 is a schematic of the displacement processing method of a third preferred embodiment.
Figure 4:
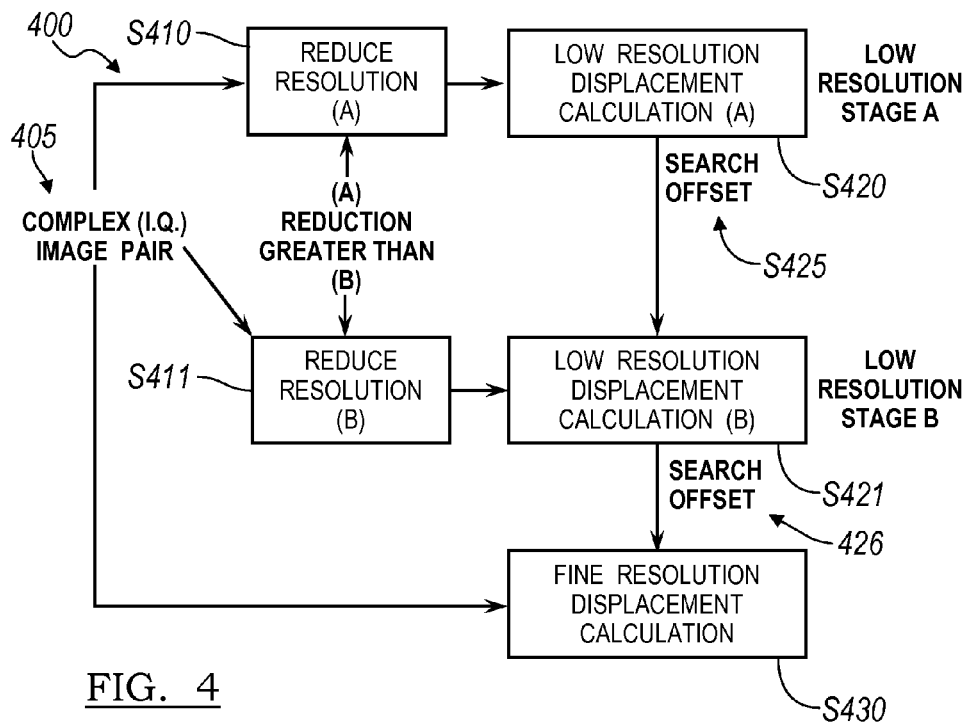
FIG. 4 is a schematic of a multiple pass, multi-resolution processing displacement processing method of a fourth preferred embodiment.

As shown in FIGS. 1-4, the preferred methods of the invention, which are used to track speckle displacement between a first image and a second image, include the steps of calculating at least one coarse displacement estimate and calculating at least one finer displacement using the coarse displacement estimate. The general method is shown in FIG. 1, while alternative methods are shown in FIGS. 2-4, including the addition of a resolution reduction step in FIG. 2, the addition of a sub-pixel estimation step in FIG. 3, and multiple resolution processing steps, including at least one coarse displacement estimate and at least two finer displacement estimation steps, in FIG. 4. The images, which are generally labeled as an input 105, preferably includes at least two ultrasound images, and more preferably includes complex data generated from an ultrasound acquisition subsystem (e.g. beamformer and complex data processing). While the invention provides advantages in the medical ultrasound field, the methods may be applied to any field where correlation based tracking is used.

As shown in FIG. 1, the first method of tracking speckle displacement 100 includes the steps of (a) calculating a coarse displacement estimate S120, and (b) calculating at least one finer displacement S130.

Step S120 functions to calculate a coarse (low resolution) displacement estimate 135 from the ultrasound images. The coarse displacement is preferably calculated by cross correlating at least two image frames 105, and the peak of the cross correlation function is preferably used as a coarse displacement estimate. However, any method to calculate a displacement estimate may be used. Preferably, at least one coarse displacement estimate is passed to step S130.

Step S130 functions to calculate at least one finer displacement 135 using the coarse displacement estimate from Step S120 and the original images. Coarse displacement images are preferably used as a search offset to guide at least one finer displacement estimation. The coarse displacement estimate from step S120 preferably determines regions of the original images to cross correlate. The finer displacement 135 is preferably the location of the peak value of the cross correlation function. More preferably, the finer displacement processing provides estimates of lateral and axial motion, preferably with integer pixel accuracy.

As shown in FIG. 2, the second method of tracking speckle displacement 200 includes the steps of: reducing the resolution of the complex images S210; calculating a coarse displacement estimate S220; and calculating at least one finer displacement S230.

Step S210 functions to reduce the resolution of at least two images 205 to at least one lower resolution. The resolution is preferably reduced via decimation, but any method to reduce resolution may be used. More preferably the images are low pass or bandpass filtered prior to decimation. The relationship of the original image to the reduced-resolution image is preferably reduced by a factor of 2-10, but may alternatively be any relationship where the finer resolution includes a greater pixel count than the coarse resolution.

Step S220, which is similar to Step S120, functions to calculate a coarse (low resolution) displacement estimate 235 from the reduced resolution images. The coarse displacement is preferably calculated by cross correlating at least two low resolution image frames, and the peak of the cross correlation function is preferably used as a coarse displacement estimate. However, any method to calculate a displacement estimate may be used. More preferably, the coarse displacement calculation includes correlation function averaging. The coarse displacement estimate images are preferably upsampled to a higher resolution for application in processing step S230.

Step S230, which is similar to Step S130, functions to calculate at least one finer displacement 235 from the coarse displacement estimate from Step S220 and the original images. Coarse displacement images, produced from the low resolution processing, are preferably used as a search offset to guide at least one higher resolution displacement estimation. The upsampled, coarse displacement images from step S220 preferably determine regions of the original images to be preferably cross correlated in at least one finer resolution. The finer displacement 235 is preferably the location of the peak value of the cross correlation function. More preferably, the finer displacement processing provides estimates of lateral and axial motion, preferably with integer pixel accuracy.

As shown in FIG. 3, the third method of tracking speckle displacement method 300 includes the steps of: reducing the resolution of the complex images S310; calculating a coarse displacement estimate S320; calculating at least one finer displacement S330; and sub-pixel estimation S340. Steps S310 and S320 of method 300 are preferably identical to Steps S210 and S220 of method 200. Step S330 is preferably identical to Step S230, except that Step S330 also functions to determine the correlation magnitudes 345 of the finer displacement estimate.

Step S340 functions to further increase the accuracy of the displacement estimate and calculates at least one sub-pixel estimate of the displacement 335. Preferably, only the local search region of the correlation function is needed for sub-pixel displacement processing. Sub-pixel displacement calculation is preferably accomplished by parametric model fitting the correlation function from S330 to estimate the location (i.e., sub-pixel lag) of the correlation function peak, or by zero crossing of cross correlation function phase from S330 if complex image frames are used as input 305. Sub-pixel displacement calculation may, however, be accomplished by any suitable method or device.

As shown in FIG. 4, the fourth method of tracking speckle displacement 400 uses sequential coarse resolution estimates 425, 426 to further increase search dynamic range. Each coarse estimation stage has successively finer resolution, and results from the previous estimation stage define the search offset 425, 426 for the current stage. Preferably, for coarse resolution stages, only magnitude data is processed. Two coarse resolution processing stages are shown, followed by fine resolution processing. Although two coarse resolution passes are shown, any number of coarse resolution passes can be done to provide the desired search size. The upsampling of coarse displacement estimates preferably increases the resolution to match the following stage. The resolution of stage A is lower than stage B, and results from each stage determine the search offset 425, 426 for the following stage. Typically, the number of stages is determined by the required search area and processing limitations (e.g., maximum search lag for single stage). Each coarse resolution processing pass preferably includes components described below (as shown in FIGS. 5-8).

The method 400 of the fourth preferred embodiment includes the steps of: reducing the resolution of the complex images S410; calculating a first coarse displacement estimate S420; reducing the resolution of the complex images to a second level S411; calculating a second coarse displacement estimate S421; and calculating at least one finer displacement S430. Except as noted below, Steps S410, S420 and S430 of the fourth preferred embodiment are similar to step S210, S220 and S230 of the second preferred embodiment of the invention, using at least two images 405 as inputs. Step S411 and S421 are identical to steps S410 and S420 above, except that the resolution may be reduced by a smaller factor (resulting in a higher resolution image) and Step S421 may use any number of displacement estimates from the previous stages to guide the correlation search.

2. Calculation of a Course Displacement Estimate

Figure 5:
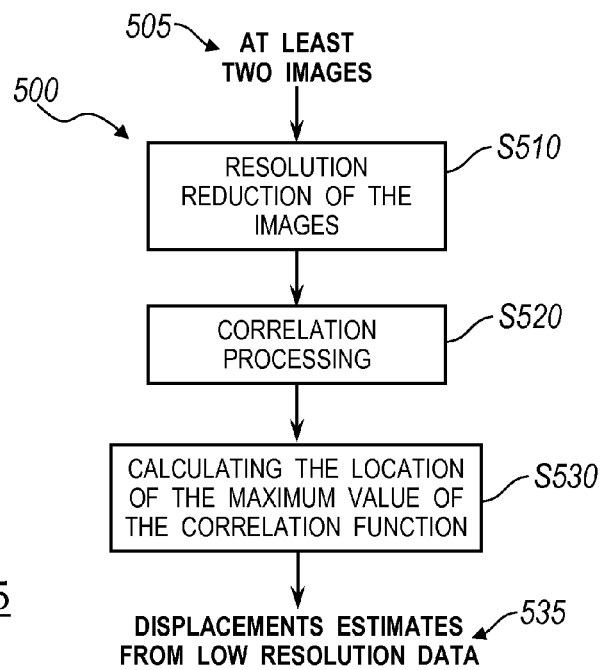
FIG. 5 is a schematic of the first preferred embodiment of the coarse displacement processing method.

As shown in FIG. 5, a first version 500 of the step for calculating a coarse displacement estimate for at least two images includes the steps of: (i) reducing the resolution of at least two complex images S510; (ii) correlating the reduced resolution images S520; and (iii) calculating the location of the maximum value of the correlation function and output the location as the displacement estimate S530.

Step S510 functions to reduce the resolution of at least two complex images to at least one reduced resolution. The resolution is preferably reduced via decimation, but any method to reduce resolution may be used. More preferably the images are low pass filtered prior to decimation. The intensity of the images is preferably calculated prior to one of: low pass filtering and decimation.

Step S520 functions correlate the reduced resolution images. The reduced resolution image frames are preferably cross correlated. The cross correlation is preferably on a subset of the full image, or image window, for each pixel of the full image frames. The image frames are preferably intensity image frames. Preferably the correlation function is spatially averaged.

Step S530 functions to calculate the location of the maximum value of the correlation function and output the location as the displacement estimate 535. The coarse displacement estimates are preferably one axial image and one lateral image. The coarse displacement estimate images are preferably upsampled to a higher resolution.

As shown in FIG. 6, a second version 600 of the step for calculating a coarse displacement estimate for at least two images includes the following steps: (i) detecting the intensity of at least two complex images S610; (ii) low pass filtering the intensity images S620; (iii) decimating the filtered intensity images S630; (iv) correlating the low resolution images S640; (v) correlation function averaging S650; (vi) calculating the correlation peak of the averaged correlation function S660; and (vii) upsampling the low resolution displacement images S670.

Step S610 functions to detect the intensity of at least two complex images, producing real images 610. Complex (I,Q) data 605 is preferably not needed for low resolution processing if no fine resolution refinements using signal phase are done at this stage. Therefore, only real data is preferably processed. Specifically, the intensity of at least two complex data frames is preferably calculated, given by the following equation:

$$P(a,l)=d(a,l) \times d^*(a,l)=I^2(a,l)+Q^2(a,l)$$

where P is the intensity image, d is complex frame with real and imaginary components I and Q, respectively. The axial and lateral coordinates are denoted by a and l. Intensity can be used instead of magnitude since only the location (lags) of the correlation peak is needed. This is advantageous since square root calculations require additional computational resources.

Step S620 functions to low pass filter the intensity images from step S610. The intensity image data is preferably low pass filtered prior to decimation to avoid aliasing and improve signal to noise (SNR).

Step S630 functions to decimate the filtered intensity images from Step S620, producing low resolution images 635. The filtered intensity images are preferably decimated prior to correlation processing. The low resolution intensity images are described by the following equation:

$$P_{LR}(a_{LR},l_{LR})=D(P(a,l))$$

where D( ) is the decimation function, $P_{LR}$ is the filtered decimated intensity image with axial and lateral sample indices $a_{LR}$ and $l_{LR}$.

Step S640 functions to correlate the low resolution images, producing a correlation function or square of the correlation function (i.e., $\rho^2$) value for each low resolution pixel 645. Low resolution intensity image frames 635 are preferably cross correlated according to the following equation:

$$\rho^2_{LR}(a_{LR}, l_{LR}; g_{LR}, h_{LR}) = \frac{\sum_{j=-L/2}^{L/2} \sum_{i=-K/2}^{K/2} \left( W_{ij} P_{LR,1}(a_{LR}+i, l_{LR}+j) \atop P_{LR,2}\left( {a_{LR}+i-g_{LR}, \atop l_{LR}+j-h_{LR}} \right) \right)^2}{\sum_{j=-L/2}^{L/2} \sum_{i=-K/2}^{K/2} W_{ij} P_{LR,1}\left( {a_{LR}+i, \atop l_{LR}+j} \right)^2 \sum_{j=-L/2}^{L/2} \sum_{i=-K/2}^{K/2} W_{ij} P_{LR,2}\left( {a_{LR}+i-g_{LR}, \atop l_{LR}+j-h_{LR}} \right)^2}$$

where $P_{LR,1}$ and $P_{LR,2}$ are low resolution intensity image pair with axial and lateral indices of $a_{LR}$ and $l_{LR}$, respectively. Lag indices $g_{LR}$ and $h_{LR}$, and window sample indices i and j, refer to low resolution sampling. The window weighting is $W_{ij}$ with dimension K by L. The axial and lateral lags are denoted by g and h, respectively. The square of the correlation function is preferably calculated for low resolution processing, which is acceptable, since the only the peak location of the correlation function is sought, not the correlation function itself. The expression assumes $P_{LR,1}$ and $P_{LR,2}$ are real valued images. The square of the low resolution correlation function is preferably calculated to reduce computation cost by avoiding square root calculation.

Step S650 functions to average the correlation function produced in S640. The low resolution correlation functions for each pixel are spatially averaged to reduce variance and error, improving performance. Correlation function averaging is described by the following equation:

$$\rho^2_{LR,filtered}(a_{LR}, l_{LR}; g_{LR}, h_{LR}) = \sum_{i=-K/2}^{K/2} \sum_{j=-L/2}^{L/2} F_{ij} \rho^2_{LR}\left( {a_{LR}+i, l_{LR}+ \atop j; g_{LR}, h_{LR}} \right)$$

where the correlation averaging weighting window is $F_{ij}$.

Step S660 functions to calculate the correlation peak of the averaged correlation function and produces at least two images of the displacement location 665. The location (i.e., lag indices) of the correlation function ($r^2_{LR,filtered}$) maximum is preferably calculated for each low resolution sample. From this, two low resolution images are produced according to the following equation:

$$U_{LR}(a_{LR},l_{LR})=g_{LR}^{peak}(a_{LR},l_{LR}) \times D_{axial}$$

$$V_{LR}(a_{LR},l_{LR})=h_{LR}^{peak}(a_{LR},l_{LR}) \times D_{lateral}$$

where U and V are axial and lateral displacement images, respectively. Indices of the correlation peak are $g_{LR}^{peak}$ and $h_{LR}^{peak}$. $D_{axial}$ and $D_{lateral}$ are the decimation factors from full to low resolution.

Step S670 functions to upsample the low resolution displacement images 665 to at least one higher resolution, producing at least one displacement estimate image 675. The low resolution displacement estimates 675 are preferably applied to fine resolution processing, requiring coarse displacement estimates for each fine (i.e., original) resolution pixel. Therefore, low resolution displacement images 665 are preferably upsampled to the original full resolution sampling, according to the following equation:

$$U_{LR}(a,l)=R(U_{LR}(a_{LR},l_{LR}))$$

$$V_{LR}(a,l)=R(V_{LR}(a_{LR},l_{LR}))$$

where R denotes the upsampling operator. For example, interpolation or replication could be used to upsample coarse displacement maps to fine resolution sampling.

As shown in FIG. 7, a third version 700 of the step for calculating a coarse displacement estimate includes the same steps as the second version 600, and also includes the step of low band filtering S762. Step S762 functions to filter the coarse displacement estimates. The coarse displacement estimates are preferably low pass filtered (i.e., smoothed) to improve signal to noise ratio and to better match mechanical properties of the measured stuff. The processing chain includes low pass filtering after coarse displacement measurement (i.e., calculation of the correlation peak). The processing may also be done without correlation function averaging, relying on only low pass filtering to provide noise reduction and smoothing of estimates.

As shown in FIG. 8, a fourth version 800 of the step for calculating a coarse displacement estimate includes many of same steps as the third version 700, except that the fourth version includes the step of interpolation of the correlation peak S860. Step S860 functions to improve the accuracy of the coarse displacement estimates. The coarse displacement estimates (with pixel resolution) may be improved by sub-pixel refinement using interpolation or parametric model fit to estimate the sub-pixel the peak position of the correlation function. Both axial and lateral coordinates may be refined.

3. Calculation of a Finer Displacement Estimate

As shown in FIG. 9, the first version 900 of the step for calculating a high resolution displacement accepts inputs of at least one coarse displacement estimate 904 and at least two images 905. The coarse estimate input is preferably calculated in the methods above, but any coarse estimate may be used as an input. The method includes the steps of: i) correlating the ultrasound images using at least one low resolution displacement estimate as a search offset S910 and output correlation images 925; ii) calculating the location of the maximum value of the correlation function S920 and output as a local displacement estimate 935 which may also be used as a low resolution displacement estimate.

Step S910 functions to correlate the images 905 using the displacement estimate 904 as a search offset. The original images 905 along with upsampled, coarse displacement estimate images 904 are preferably used for full resolution cross correlation processing. The coarse displacements 904 determine the local region for displacement tracking. Fine resolution cross correlation is completed about the low resolution coarse displacement estimate, producing a local estimate of the displacement at the finer resolution. Correlation images 925 of the maximum correlation at each pixel are preferably calculated. The total displacement estimate is the addition of the low and fine resolution estimates.

Step S920 functions to calculate the location of the maximum value of the correlation function and output the location as a finer displacement estimate 935. The location of the maximum lag represents the fine displacement estimate 935.

Figure 10:
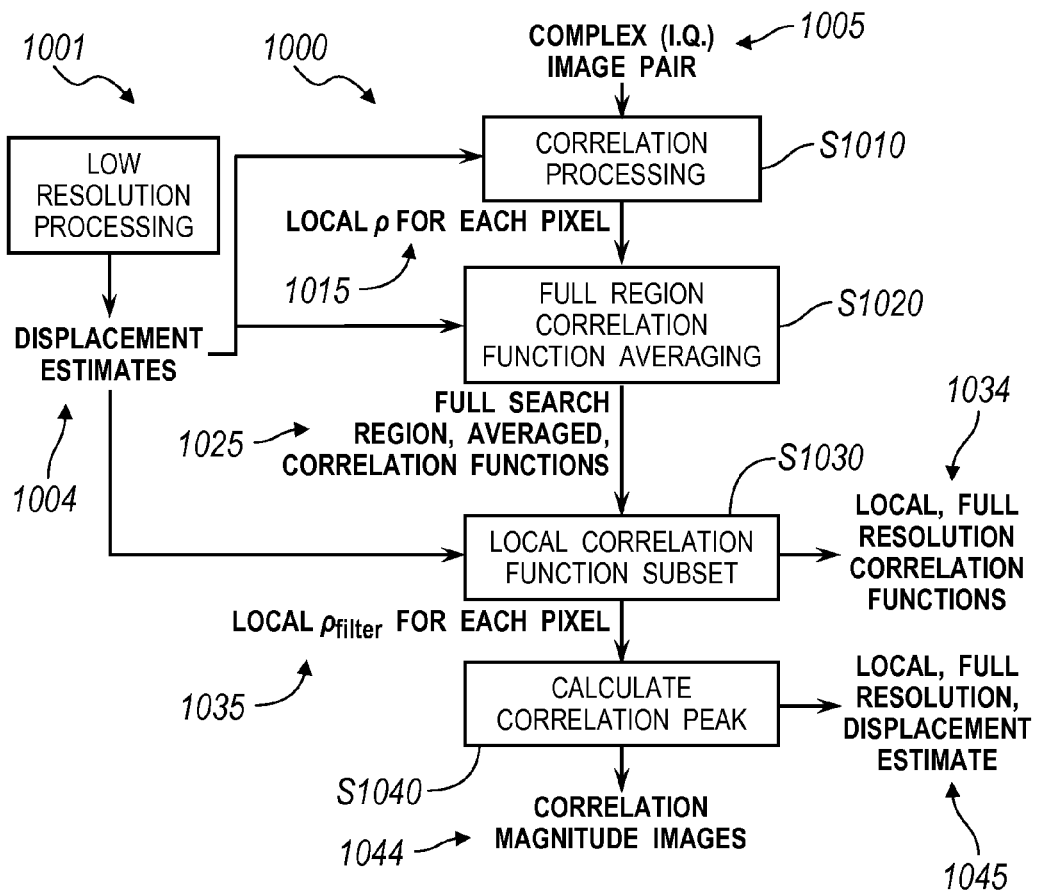
FIGS. 10 and 11 are schematics of the second and third preferred embodiments of the displacement processing method using multi-resolution data.

As shown in FIG. 10, the second version 1000 of the step for calculating a high resolution displacement includes the steps of: i) correlation processing S1010; ii) full region correlation averaging S1020; iii) local correlation function subset S1030, iv) calculating the correlation peak S1040.

Step S1010 functions to perform full resolution cross correlation of the original complex images along with at least one upsampled, coarse displacement image. The coarse estimate input is preferably calculated in the methods above, but any coarse estimate may be used as an input. The coarse displacements determine the local region for tissue tracking described by the following equation:

$$\rho(a, l; g, h) = \frac{\sum_{j=-L/2}^{L/2} \sum_{i=-K/2}^{K/2} W_{ij} d_1(a+i, l+j) d_2^* \begin{pmatrix} a+i-g+ \\ U_{LR}(a, l), l+j-h+ \\ V_{LR}(a, l) \end{pmatrix}}{\sqrt{\sum_{j=-L/2}^{L/2} \sum_{i=-K/2}^{K/2} W_{ij} |d_1(a+i, l+j)|^2 \sum_{j=-L/2}^{L/2} \sum_{i=-K/2}^{K/2} W_{ij} \left| d_2 \begin{pmatrix} a+i-g+ \\ U_{LR}(a, l), l+j-h+ \\ V_{LR}(a, l) \end{pmatrix} \right|^2}}$$

In this case, the full, complex cross correlation is described, with the local search offset by the low resolution displacement estimates, $U_{LR}(a,l)$ and $V_{LR}(a,l)$ at each pixel. All lag and sample indices are with respect to the fine, original image sampling. An example of the relationship between the low resolution and full resolution correlation searches is shown in FIG. 12. The top panel represents two frames. Tracking is performed on the central pixel of frame 1, which moves to the upper right of frame 2. The low resolution, coarse, displacement estimate is the upper right low resolution lag location. Fine resolution cross correlation is completed about this point, producing a local estimate of the upper left fine resolution lag location. The total displacement estimate is the addition of the low and fine resolution estimates. The full (fine) resolution cross correlation is preferably calculated about the low resolution displacement estimate per this equation.

Step S1020 functions to perform full region correlation averaging. Correlation function averaging is preferably done on full search region correlation functions to accommodate the offsets from the low resolution displacement estimates. Because the pixels have differing coarse displacements, the position of the local correlation functions are preferably adjusted based on the low resolution displacements. An example of full region and local correlation averaging is shown in FIG. 13. In this case, the correlation functions of two neighboring pixels with nearly identical displacement are presented in the top row. The circle denotes the peak of the correlation function. In this case, the displacement can be described by two sets of low and fine resolution estimate. Therefore, averaging local correlation functions would combine information from two different spatial regions, as seen in the middle row. To correctly average the correlation functions, the full region is preferably combined, illustrated by the bottom row. The full region correlation functions are calculated according to the following equation:

$$\rho_{FR}(a, l; g_{FR}, h_{FR}) = \rho(a, l; g, h)$$

where $g_{FR}$ and $h_{FR}$ denote the full region lags given by the following equation:

$$g_{FR}(a,l) = g(a,l) + U_{LR}(a,l)$$

$$h_{FR}(a,l) = h(a,l) + V_{LR}(a,l)$$

For a given pixel location, only a subset corresponding to the correlation search size (N×M) is defined in the full ($D_{axial}$N× $D_{lateral}$M), correlation matrix. The correlation function is preferably zero for lags outside the local, fine resolution, correlation region. The full region correlation function averaging is described by the following equation:

$$\rho_{FR,filt}(a, l; g_{FR}, h_{FR}) = \sum_{i=-K/2}^{K/2} \sum_{j=-L/2}^{L/2} F_{ij} \rho_{FR}(a+i, l+j; g_{FR}, h_{FR})$$

Step S1030 functions to calculate the local correlation subset. Preferably, only the local search region of the averaged correlation function is needed for sub-pixel displacement processing. Therefore, each $r_{FR,filtered}$ is subsetted, according to the following equation:

$$\rho_{filt}(a,l;g,h) = \rho_{FR,filt}(a,l;g+U_{LR}(a,l),h+V_{LR}(a,l))$$

Equivalently, the full region averaging and correlation function subset can be combined by only averaging across the local lags (g,h) for each sample. The filtered and subsetted correlation functions correspond to the local search region and of size.

Step 1040 functions to calculate the correlation peak. The maximum correlation is an indicator of the tissue tracking performance and is preferably calculated for each pixel per the following equation:

$$|\rho(a,l) = \max\{o_{filt}(a,l;g,h)\}$$

The location of the maximum lag represents the fine displacement estimate. The fine displacement determined by the lag location of the correlation peak is preferably calculated and denoted by $g_{max}(a,l)$, $h_{max}(a,l)$.

Figure 11:
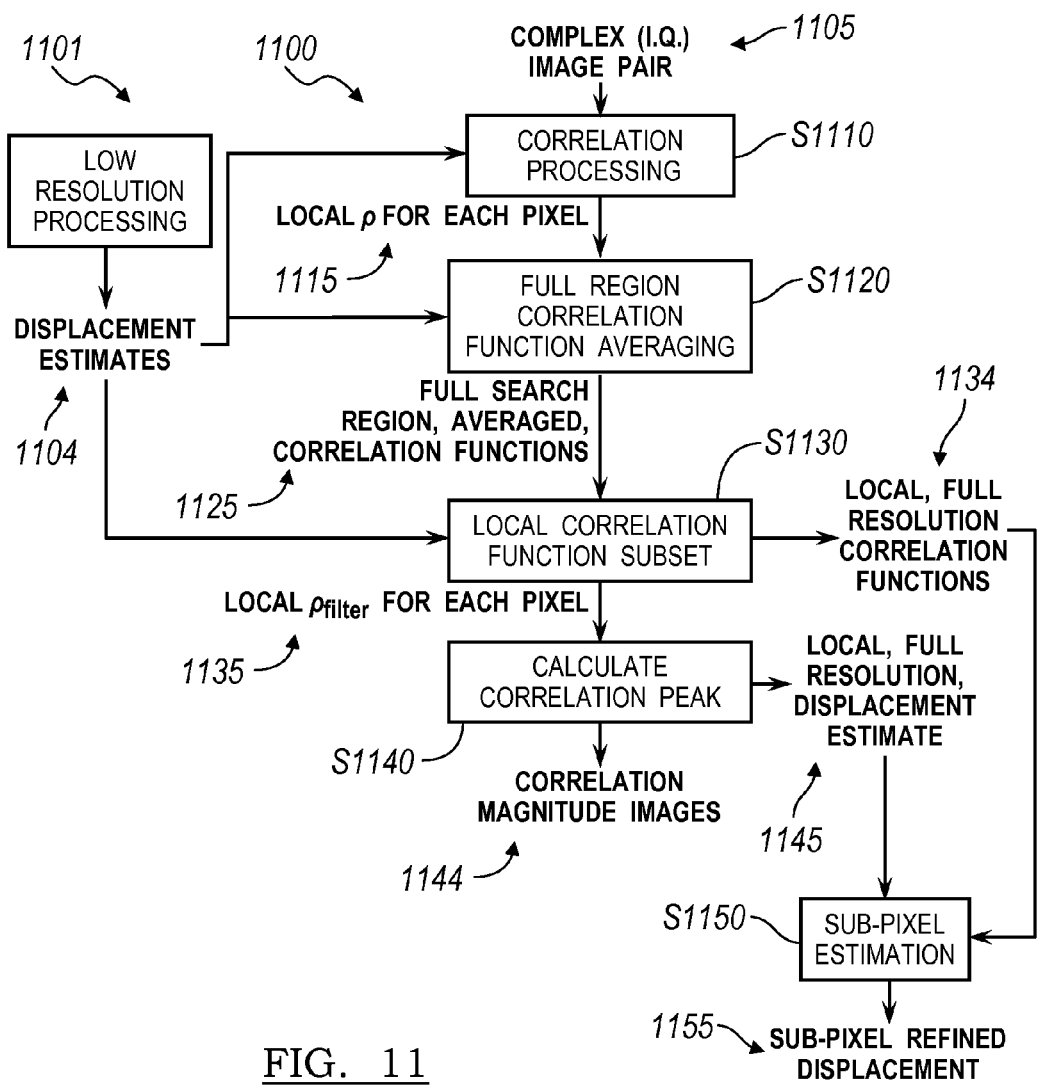

As shown in FIG. 11, the third version 1100 of the step for calculating a high resolution displacement also includes the step of sub-pixel estimation S1150. Step S1150 functions to calculate a sub-pixel refined displacement 1155, which is preferably calculated using the local correlation function 1134 and by adjusting the high resolution pixel-precision displacement estimate 1145 calculated from the peak of the correlation function determined for each pixel in step S1140. The sub-pixel refined displacement 1155 is preferably calculated using one of the following methods: i) parametric modeling of correlation peak location, ii) interpolation of peak location and/or iii) estimated phase zero crossing of complex correlation function.

As a person skilled in the art will recognize from the previous detailed description and from the figures and claims, modifications and changes can be made to the preferred embodiments of the invention without departing from the scope of this invention defined in the following claims.

We claim:

1. A method of tracking speckle displacement between a first complex image and a second complex image, comprising the steps of:
   (a) calculating at least one coarse displacement estimate for at least one image location from the first complex image comprising a first real portion and a first imaginary portion and the second complex image comprising a second real portion and a second imaginary portion, wherein calculating comprises:
      (i) reducing the resolution of the first complex image and the second complex image;
      (ii) correlating at least an image subset of the first reduced resolution complex image with the second reduced resolution complex image; and
      (iii) for each pixel in each of the first reduced complex image and the second reduced complex image, calculating the location of the maximum value of the correlation function as a coarse resolution displacement estimate by calculating the maximum value of the square of the correlation function; and
   (b) calculating at least one fine resolution displacement estimate from at least one coarse displacement estimate, the first complex image, and the second complex image.

2. The method of claim 1, wherein step (a)(i) includes at least one method selected from the group of: intensity detection, decimation and filtering.

3. The method of claim 2, wherein step (a)(ii) includes at least one method selected from the group consisting of: correlation function filtering and correlation function averaging.

4. The method of claim 3, wherein step (a)(iii) includes at least one method selected from the group consisting of: interpolating at least one correlation peak, filtering of correlation peak value and lag location, and upsampling.

5. The method of claim 1, wherein step (b) includes the steps of:
   (i) correlation processing of the first and second complex images using at least one coarse displacement estimate; and
   (ii) calculating the location of the maximum value of the correlation function as a fine displacement estimate.

6. The method of claim 5, wherein step (b)(i) includes at least one method selected from the group consisting of: full correlation function averaging, full correlation function filtering, and calculating a local correlation function subset.

7. The method of claim 6, wherein step (b)(ii) includes at least one method selected from the group consisting of: performing sub-pixel displacement estimation, filtering of correlation peak value and lag location, and calculating the magnitude of the correlation function.

8. The method of claim 5 wherein step (b)(ii) includes calculating the maximum value of the square of the correlation function to determine the location of the maximum value of the correlation function.

9. A method of calculating at least one coarse displacement estimate from a first complex image and a second complex image, comprising the steps of:
   (a) reducing the resolution of the first complex image and of the second complex image, wherein the first image comprises a first real portion and a first imaginary portion and the second image comprises a second real portion and a second imaginary portion;
   (b) correlating at least an image subset of the first reduced resolution image with the second reduced resolution image; and
   (c) calculating the location of the maximum value of the square of the correlation function as a coarse displacement estimate.

10. The method of claim 9, wherein step (a) includes at least one method selected from the group of: intensity detection, decimation and filtering.

11. The method of claim 10, wherein step (c) includes at least one method selected from the group consisting of: interpolating at least one correlation peak, filtering, filtering of correlation peak value and lag location, and upsampling.

12. A method of calculating a fine displacement estimate from a first complex image and a second complex image and at least one coarse displacement estimate image, comprising the steps of:
   (a) correlating the first complex image and the second complex image using the at least one coarse displacement estimate image, wherein the first complex image comprises a first real portion and a first imaginary portion and the second complex image comprises a second real portion and a second imaginary portion; and
   (b) calculating the location of the maximum value of the correlation function as a fine displacement estimate.

13. The method of claim 12 further comprising the step of calculating additional finer displacement estimates using at least two complex images and at least one previously calculated displacement estimate as a coarse estimate.

14. The method of claim 12, wherein step (b) includes at least one method selected from the group consisting of: performing sub-pixel displacement estimation, filtering, filtering of correlation peak value and lag location, and calculating the magnitude of the correlation function.

15. A method for calculating the movement of biological tissue, comprising the steps of:
   (a) receiving a first complex ultrasound image of biological tissue, the first complex ultrasound image comprising a first real portion and a first imaginary portion;
   (b) receiving a second complex ultrasound image of biological tissue, the second complex ultrasound image comprising a second real portion and a second imaginary portion;

(c) reducing the resolution of the first ultrasound image and second ultrasound image;
(d) calculating a coarse resolution speckle displacement based on the reduced resolution first ultrasound image and the reduced resolution second ultrasound image;
(e) calculating a fine resolution speckle displacement based on the coarse resolution speckle displacement, the first complex ultrasound image, and the second complex ultrasound image; and
(f) calculating the movement of biological tissue based on the fine resolution speckle displacement.

16. The method of claim 15, further comprising diagnosing and monitoring patients with heart disease based on the movement of biological tissue calculation.

17. The method of claim 7, wherein step (b)(ii) further includes upsampling.

18. The method of claim 14, wherein step (b) further includes upsampling.

* * * * *